March 8, 1960  E. M. ROTHERMEL ET AL  2,927,625
METHOD OF MAKING A REINFORCED CORRUGATED HOSE
Filed Nov. 22, 1957  2 Sheets-Sheet 1

INVENTORS
EDWARD M. ROTHERMEL
RUSSELL B. WADDELL JR.
BY
Reuben Wolk
ATTORNEY

March 8, 1960  E. M. ROTHERMEL ET AL  2,927,625
METHOD OF MAKING A REINFORCED CORRUGATED HOSE
Filed Nov. 22, 1957  2 Sheets-Sheet 2

INVENTORS
EDWARD M. ROTHERMEL
RUSSELL B. WADDELL JR.
BY
Reuben Wolk
ATTORNEY

United States Patent Office 2,927,625
Patented Mar. 8, 1960

2,927,625

METHOD OF MAKING A REINFORCED CORRUGATED HOSE

Edward M. Rothermel and Russell B. Waddell, Jr., Waynesville, N.C., assignors to The Dayton Rubber Company, Dayton, Ohio, a corporation of Ohio Application November 22, 1957, Serial No. 698,123

3 Claims. (Cl. 154—8)

The present invention relates to a method of manufacturing flexible hose, particularly hose adapted for use with fluid transfer devices such as vacuum cleaners, oxygen and respiratory equipment, cooling systems and the like.

More particularly, the present invention relates to the manufacture of hose having a corrugated or convoluted tubular body and having a plastic surfaced helical reinforcing member incorporated therewith, as described in copending applications Serial No. 496,507, filed March 24, 1955; and No. 611,007, filed September 20, 1956, now Patent No. 2,822,857; and in Patents No. 2,766,806, issued October 16, 1956, and No. 2,782,803, issued February 26, 1957.

In the art of fluid transfer it is often desirable to employ a flexible conduit which is impervious to the passage of the fluid being transmitted, light in weight, and pleasing in appearance. The flexibility requirements for this type of hose are often severe and extremely critical, and it is not uncommon that the hose will be expected to have sufficient flexibility to be bent through an angle of 180 degrees without exerting a substantial counterforce to such bending. Notwithstanding the desire for the lightness in weight and extreme flexibility, however, it is often a necessary requirement that hose falling in this category be reinforced against radial collapse so that when, for example, the hose is bent or flexed through substantially 180 degrees, the inside diameter of the conduit will be maintained and no restriction to the flow of the fluid therewithin will arise. It is also essential that hose of this type be able to withstand many repeated flexings of this nature over a long period of time, for years in fact, without cracking or losing its strength and flexibility.

In order to obtain these desired and necessary features, it has been found that the most practical expedient is to employ a very simple basic conduit construction which consists primarily of a spiral or similar circumferential reinforcing member positioned within an elastomeric tubular body member, the latter being convoluted between the turns of the reinforcing spiral or helix. In order to preserve the relationship between the reinforcing member and the tubular member of the hose according to this basic construction and more specifically to preserve the axial spacing of the individual turns of the reinforcing helix, it was previously found desirable to mold or otherwise permanently form the corrugations in the tubular member so that these corrugations surrounded and partially isolated each of the respective turns of the reinforcing member. The individual turns were thus held apart by a distance at least equal to twice the thickness of the tube whenever a force was exerted against these turns which tended to cause them to collapse upon each other and to constrict the flow of the fluid in the hose. Thus, the recent developments in the art of flexible conduits have made available the theoretically desirable simple hose construction involving only an outer tubular body member and an inner reinforcing member.

Such construction presents new problems because the irregular inner conduit surface results in loss of fluid transmission efficiency and the reinforcing member is exposed to the deteriorating effects of any fluid passing through the conduit. In the development of this basic construction involving the tubular member surrounding a helical reinforcement, it was first found that the undesirable corroding and wearing effects upon the reinforcing member of the fluid passing within the conduit could be circumvented by forming the reinforcing coil of a material which was resistant to such influences. Consequently, a helix of a material presenting a plastic surface such as a plastic coated wire was found to be desirable.

Hose of the above-mentioned type is frequently utilized with metal end fittings at both ends, one end fitting being adapted for attachment to an appliance such as a vacuum cleaner, the other end fitting being adapted for attachment to a cleaning tool or to a metal tube or wand which is in turn attached to a rug nozzle or the like. It has been found that the use of such end fittings produces a nonuniform and disproportionate degree of stress near the end area of the tube adjacent to the fitting, and that this may result in stress cracking, leakage and premature damage to the hose in the area adjacent to the point where the fitting terminates. This damage will especially tend to occur when the hose is stored for even short periods of time, because of the tendency of the fitting to place stresses at the portion of the hose which assumes an arc. Slightly elevated temperatures tend to induce a cold flow in these plastic materials, setting up a stress which will create a small crease in the outer cover. Although the initial crease may be tiny, it serves as a focal point for cracks of larger magnitude at even more elevated temperatures. Attempts have been made to remedy these difficulties by the incorporation of additional reinforcing layers of plastic material or fabric in this area, but such expedients have been found to be undesirable, due to the fact that they increased the stiffness and weight of the product.

Applicants have now discovered that the problem may be remedied by utilizing the above principle in constructing the hose so that the end region will possess a greater degree of flexibility than the intermediate portion of the hose. This greater degree of flexibility appears to eliminate, modify or absorb the stresses which normally occur in the areas of the hose adjacent to the fitting, thus eliminating the tendency of the hose to crack prematurely, with resultant increase in the life of the product. More particularly, it has been found that this greater degree of flexibility may be imparted by increasing the depth of the convolutions relative to the depth of the convolutions elsewhere in the hose, at either or both ends. This increased depth is obtained by making the hose in the general manner described in the aforesaid copending applications and patents, and thereafter changing the spacing of the individual turns of the reinforcing member by bringing them closer together in the end regions of the hose, while at the same time deepening the convolutions in that area. Where it is desired to retain the original spacing of the convolutions uniformly throughout the length of the conduit, the hose may be made with the turns of the helical reinforcement spaced farther apart at either or both ends than in the remainder of the hose, and thereafter bringing the turns in the end area closer together until the desired spacing is attained. At the same time, the tubing must be permanently set so that the convolutions will remain in that position.

In view of the thermoplastic nature of the tubing within which the reinforcement is positioned, one method of obtaining the modified differential type of spacing required is by initially forming the coiled helix with a spacing closer than that which is ultimately desired, and then stretching the coil to provide the desired spacing of the turns between the ends of the hose and a greater degree of spacing at the ends. This means that there will be a greater degree of tension or inward axial pull at the ends of the coiled helix or spring. The spring is then held in its stretched condition during the application and bonding thereto of the outer thermoplastic tube in the manner described in the above-mentioned copending applications and patents. Due to the greater tension at the ends, the coils will tend to retract a greater distance bringing with them the material of the tube, thus forming deeper convolutions at the ends of the hose than in the middle.

It is generally found that unless the coils of the reinforcement possess a high degree of spring or tension, the material of the tube, which has a normal degree of internal resistance to contraction, will tend to keep the turns of the helix from relaxing fully to their normally coiled position. In such case a preferred method is to heat the ends of the hose to a temperature approaching, but below, the softening point of the thermoplastic material, thereby facilitating the retracting action of the coils and bringing the convolutions together to the desired extent. By coordinating the tension of the spring, the distance of stretching or spacing of the convolutions, and the time and temperature and heating, a desired degree of return or relaxation is obtained to give a desired depth of convolution with a desired resultant degree of flexibility at the ends. Upon cooling of the hose following the heating stage, the product becomes set in this relaxed position.

It is the object of the present invention to provide a method of manufacturing hose having a higher degree of flexibility at one or both ends than in the remaining portion thereof.

The invention thus generally described may be more clearly understood by reference to the following detailed description of certain preferred embodiments thereof, as described in connection with the appended drawings.

Figure 1:
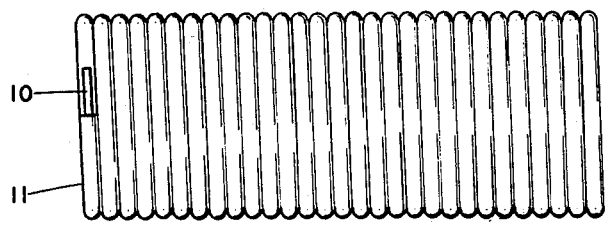
Figure 1 is a view in elevation of a reinforcing coil to be used in the construction of the hose of the invention.
Figure 2:
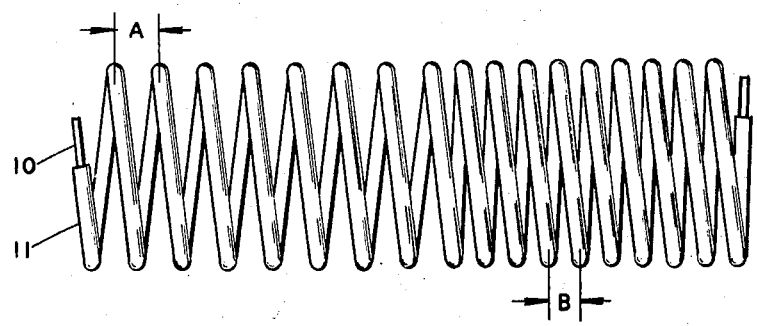
Figure 2 is a view in elevation of a reinforcing coil of Figure 1 in its stretched position prior to insertion within the tube.
Figure 3:
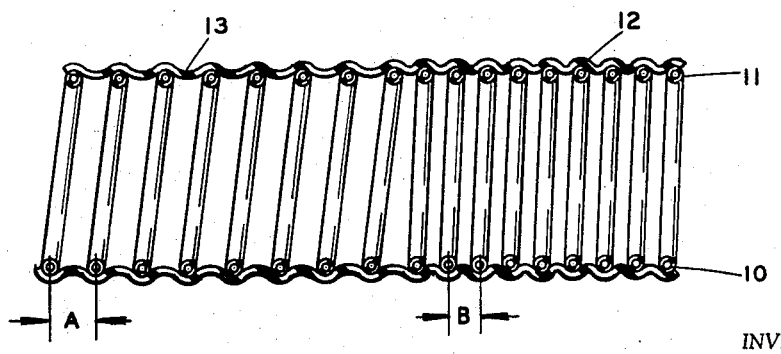
Figure 3 is a longitudinal transverse cross section of an end portion of a section of hose at an intermediate stage of its production.

Referring now to the drawings, the construction of a helical reinforcing coil is shown in Figure 1, in which a steel wire helical reinforcing coil 10 is coated with a layer of thermoplastic material 11. As shown in Figure 1, the coils of the helix are spaced close together. As shown in Figure 2, the reinforcing coil has been stretched out to provide for a certain degree of spacing between convolutions in the body portion of the hose and a somewhat greater degree of spacing in the end area of the hose. In Figure 3, the coil of Figure 2 is shown with the tube of thermoplastic material in position surrounding the turns of the coil. In the assembly of the hose, wire 10 having a thermoplastic coating 11 applied thereto is preformed into a coiled spring such as is illustrated in Figure 1. The coils are preferably formed with a close spacing and may, in fact, be formed with the individual turns in contact with each other. The coiled member is placed on a mandrel and stretched sufficiently to position the turns with the desired degree of spacing. One method of spacing the turns is in accordance with that which is disclosed in the above-mentioned Patent No. 2,822,857, in which the spring is placed upon an inflatable air bag having grooves preformed thereon in accordance with the desired spacing to be obtained. When the coiled member is in the proper position, the air bag is inflated and the turns of the coil are retained in the desired position while the outer tube or sheath 12 is positioned thereover. One preferred type of spacing is that which is illustrated in Figures 2 and 3 whereby the turns at the end of the hose would have a spacing of forty turns per foot or a center-to-center spacing of 0.30 inch, shown at A, while the body of the hose will have a spacing of forty-eight turns per foot or a center-to-center spacing of 0.25 inch, as shown at B. In this particular modification the spring tension of the coil, or the tendency to return to its originally formed position, is counter-balanced by the resistance of the outer tube with the result that the spacing at the end and in the middle of the hose is maintained at substantially forty to forty-eight turns per inch, respectively. In a preferred construction for use as a vacuum cleaner hose, wire having a diameter of about 0.050 inch with a plastic coating thereon of about 0.014 inch is formed into the coiled helix for use as a reinforcement with an inside diameter of about 1$\tfrac{9}{32}$ inches. A tube of thermoplastic material such as polyvinyl chloride, and having a one inch approximate inside diameter with a wall thickness of approximately 0.028 inch, is drawn over the coil while it is positioned on the mandrel and bonded thereto by heat or by the use of an adhesive, or merely by the inherent resilience of the material, as described in the above-mentioned copending applications and patents. One method of applying the tube is by expanding it sufficiently to permit it to be placed in position over the coil by means of differential pressure and then relaxing the tube so that it will engage the coil.

The construction shown in Figure 3 is a hose in a substantial state of completion except that its end construction is then modified in accordance with the present invention by subjecting the end to heating in order to soften the material of the tube slightly to permit the coil to retract slightly in order to increase the depth of the convolutions in the end area as mentioned above. This is accomplished as illustrated diagrammatically in Figure 4 in which the end portion 13 of the hose is immersed in hot water 14 contained in tank 15. The water is at a temperature high enough to cause sufficient softening of the material to permit the coils to draw together. The time of immersion will depend upon temperature as well as thickness of the tubing. In the hose construction described above, the time of immersion in water at 212 degrees will be about ten seconds; at 208 degrees, fifteen seconds; and at 220 degrees, three seconds. Any temperature over 210° F., of course, would have to be obtained under pressure conditions. The boiling point of water will, of course, vary depending upon the atmospheric pressure. Instead of water, the end of the tube may be heated by introducing it into a chamber filled with hot air or steam at the desired temperature. Upon removal of the end of the hose from the heating zone, it is allowed to cool and the convolutions will remain in their new position in which their depth has increased by the contraction and resultant closer spacing of the coils. The structure of the resulting hose is illustrated in Figure 5 in which the increase in depth of the convolutions at the end is illustrated at C in comparison with the depth of the convolutions in the remaining area of the hose, as shown at D. At the same time, the spacing at A has been made smaller and substantially equals the spacing at B which conforms to B in Figure 3.

Figure 4:
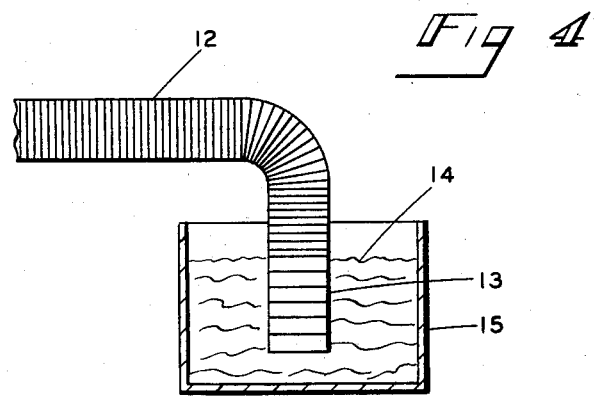
Figure 4 is a side elevational view illustrating a method of heat treating the end of a section of hose which is illustrated in Figure 3.
Figure 5:
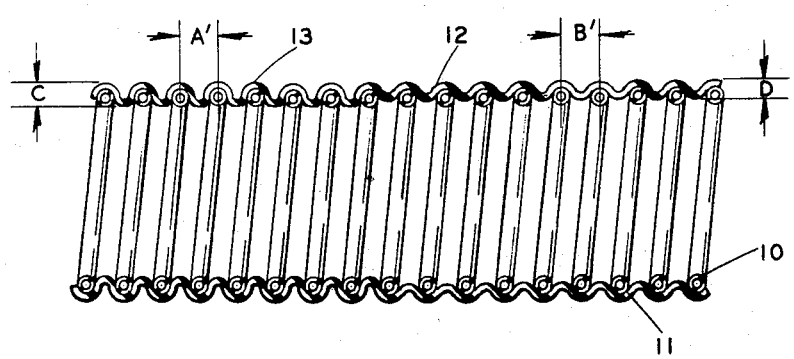
Figure 5 is a longitudinal transverse cross-sectional view of the end portion of a length of hose produced in accordance with the invention.

It should be noted that in Figures 4 and 5 the troughs of the convolutions in the untreated portion of the hose are shown extending short of the inner surfaces of the reinforcing coil, and the troughs of the convolutions in the treated area are shown to extend to the plane of the reinforcing coil. In order to obtain still more flexibility, however, the corrugations may be deepened slightly. For example, the dimension D may extend to about one sixty-fourth of an inch inward of the coil, and the dimension C about one thirty-second of an inch inwardly thereof.

When it is desired to use this hose with a vacuum cleaner, it is necessary to insert a tubular metal fitting into one end thereof in order to permit the attachment of the various types of tools utilized for different cleaning purposes. Due to the increased flexibility in the end region of the hose adjacent to the inner end of the fitting, it is found that a substantial increase in the life of the hose will result. In order to determine the amount of increase, the present type of hose with a fitting was placed in storage condition at a temperature of 150° F., adjacent a hose having uniform structure and flexibility. After forty-eight hours, both hoses were removed and placed in service and it was found that the hose made in accordance with the present invention had a service life of about three times that of the older construction. At the temperature indicated, the older type of hose developed cracks within twenty-four hours, while the newer one was crack free.

While the above description relates to a form of the invention in which uniform spacing of the convolutions is obtained although the depth of the convolutions is greater at one or both ends of the product, the same principles are applicable where the final product is one in which the convolutions at the end are more closely spaced and are at the same time deeper than in the remainder of the product. As has been indicated above, the essential requirement is that the convolutions shall be deeper at the end in order to achieve the greater degree of flexibility required in that area. Although the differential spacing of the turns of the coil is preferably obtained by first forming the coil with a uniform spacing throughout and then stretching the turns at the end farther apart than those in the remainder of the coil, the same result may also be obtained by initially preforming the coil with a greater degree of spacing between the turns at the end and then forcing the turns in the end region closer together by means of axial pressure applied to the coil after the tube has been applied thereto while maintaining the assembly at a temperature sufficiently high to cause the thermoplastic tube to approach the softening temperaure hereof followed by cooling while the tube is maintained in that position so that it will become permanently set, resulting in deeper convolutions in the end area.

In another modified form of applying the present invention, the coil may be initially preformed with the turns in the end area of the coil closer together than those in the main portion of the coil whereby there will be a greater degree of retractability at the end of the coil than elsewhere. Then, by stretching the coil to any desired position prior to applying the outer tube and thereafter permitting the coil to relax into its normal position, the convolutions at the end will retract a greater distance than those in the body of the coil resulting in the formation of deeper convolutions at the end.

The tube 12 may be formed of any thermoplastic material or any material which may be temporarily softened without impairment of its physical properties. A particularly desirable material is polyvinyl chloride and similar vinyl resins having thermoplastic as well as elastomeric properties. Vulcanized rubber or blends of rubber with polyvinyl chloride may also be used although such materials will generally require higher temperatures before any softening will occur. Although it is preferred to utilize a reinforcing coil in which the wire is preliminarily coated with a thermoplastic material of a similar nature of the composition of the tube, uncoated wire may also be used, or the wire may be merely coated with an adhesive such as a polyvinyl cement, rubber cement, or the like.

We claim:

1. A method for the manufacture of a reinforced flexible conduit having a greater degree of flexibility in an end region thereof than in the intermediate portion which comprises the steps of forming a resilient reinforcing coil of constant diameter having helical turns with a wider spacing in said end region than in said intermediate region, applying around said coil a tube of thermoplastic material which firmly embraces and depends between said turns to form a corrugated conduit, subjecting the end region of said conduit to an elevated temperature sufficient to soften said tube and reduce its axially inward force, and decreasing the space between the turns of said coil in the end region while simultaneously producing deeper corrugations in said tube between the turns than the corrugations which exist between the turns in the end region in the intermediate portion of the conduit.

2. A method for the manufacture of a reinforced flexible conduit having a greater degree of flexibility in an end region thereof than in the intermediate region of said conduit which comprises the steps of forming a resilient reinforcing coil of constant diameter having helical turns, axially stretching said coil to increase the spacing between said turns, said spacing being greater in the end region than in the intermediate region, maintaining said coil with said increased spacing while applying thereto a tubular cover of thermoplastic material which firmly embraces and depends between said turns to form a reinforced corrugated conduit, subjecting the end region of the conduit thus formed to an elevated temperature sufficient to soften said cover and reduce its axially inward force upon the turns of the coil in said end region, providing a closer coil spacing in said end region while simultaneously producing deeper corrugations in the end region than in the intermediate region of said conduit, and cooling said end region while maintaining said axially inward force.

3. A method for manufacturing a reinforced flexible conduit having a greater degree of flexibility in an end region than in the intermediate region, comprising the steps of forming a resilient reinforcing coil of constant diameter having helical turns with a wider spacing in said end region than in said intermediate region, maintaining said spacing while applying a tubular cover of thermoplastic material to embrace and depend between the turns of said coil to form a reinforced corrugated conduit, subjecting the end region to a temperature high enough to cause decrease of the axially inward force of the cover upon the turns of the coil, and causing the turns in said end region to assume a closer spacing equal to the spacing of the turns in the intermediate region while producing deeper corrugations in said cover between the turns in said end region than in the intermediate region.

References Cited in the file of this patent

UNITED STATES PATENTS

| | | |
|---|---|---|
| 962,951 | Fulton | June 28, 1910 |
| 1,547,431 | Mallory | July 28, 1925 |
| 1,727,281 | Fulton | Sept. 3, 1929 |
| 2,630,157 | Smellie | Mar. 3, 1953 |
| 2,739,616 | Duff | Mar. 27, 1956 |
| 2,766,806 | Rothermel et al. | Oct. 16, 1956 |

UNITED STATES PATENT OFFICE
CERTIFICATE OF CORRECTION

Patent No. 2,927,625                                   March 8, 1960

Edward M. Rothermel et al.

It is hereby certified that error appears in the above numbered patent requiring correction and that the said Letters Patent should read as corrected below.

Column 6, line 23, strike out "in the end region" and insert the same after "turns" in line 22, same column 6.

Signed and sealed this 17th day of April 1962.

(SEAL)
Attest:

ESTON G. JOHNSON
Attesting Officer

DAVID L. LADD
Commissioner of Patents